United States Patent [19]

Tsang et al.

[11] Patent Number: 4,537,823

[45] Date of Patent: Aug. 27, 1985

[54] METHOD OF MANUFACTURING A FRICTION ARTICLE

[75] Inventors: Peter H. Tsang, Union Lake; Joseph P. Coyle, Warren, both of Mich.; Tung Liu, Granger, Ind.; John G. VanderPoorte, St. Clair Shores, Mich.

[73] Assignee: Allied Corporation, Morristown, N.J.

[21] Appl. No.: 553,288

[22] Filed: Nov. 18, 1983

[51] Int. Cl.[3] .......................... B32B 3/26; B32B 5/18; B05D 3/12; D04H 1/64

[52] U.S. Cl. ................................. 428/308.4; 264/101; 264/119; 264/128; 264/137; 427/294; 427/370; 427/264; 428/327

[58] Field of Search ............... 264/101, 102, 109, 119, 264/128, 137; 427/294, 296, 244, 386, 387, 389.8, 370, 264; 428/308.4, 327

[56] References Cited

U.S. PATENT DOCUMENTS 3,360,415 12/1967 Hellman et al. ................ 427/296 X
3,616,841 11/1971 Walz ............................. 164/71.1 X
3,946,039 3/1976 Walz .............................. 164/113 X
4,173,681 11/1979 Durriew et al. ................ 428/327 X
4,267,285 5/1981 Broutman ....................... 428/327 X

*Primary Examiner*—Michael R. Lusignan
*Attorney, Agent, or Firm*—Leo H. McCormick, Jr.; Ken C. Decker

[57] ABSTRACT

A method of manufacturing a friction article wherein a fiber material (14) having a continuous and substantially uniform three dimensional matrix which is filled with a slurry (24) made up of fillers, friction modifiers, a reinforcing material and a liquid binder. The filled fiber material is conveyed to a dryer (32) where the volatile solution is evaporated leaving the fillers, friction modifiers, reinforcing material and binder. The filled fiber material (14) is thereafter placed in an oven (50) where a compressive force is applied thereto while the binder is cured to define a second matrix which holds the fillers, friction modifiers, and reinforcing material in the three dimensional matrix.

11 Claims, 13 Drawing Figures

FILLER
BINDER
FIBER
FRICTION MODIFIER
VOLATILE SOLUTION
VACUUM PUMP

| | * | A | B | C | D | E | F | G | H | I | J | K | L | M | N | O |
|---|---|---|---|---|---|---|---|---|---|---|---|---|---|---|---|---|
| FILLER | BARYTES | 22 | 22 | 22 | 22 | 22 | 21 | 24 | 21 | 25 | 25 | 21 | 20 | 21 | 20 | 22 |
| | WHITING | 22 | 22 | 22 | 22 | 22 | 25 | 26 | 24 | 25 | 25 | 24 | 14 | 24 | 20 | 21 |
| FRICTION MODIFIERS | PETROLEUM COKE | 13 | 13 | 13 | 13 | 13 | 14 | 15 | 14 | 15 | 15 | 14 | 13 | 14 | 14 | 14 |
| | RUBBER | 2.5 | 2.5 | 2.5 | 2.5 | 2.5 | 2 | 2 | 2 | 3 | 3 | 2 | | 2 | 2 | 2 |
| | IRON POWDER | | | | | | | | | | | | 12 | | | |
| FOAM MATERIAL | AL | 5.5 | | | | | 8 | 8 | 8 | 6 | | 8 | 2 | | 7 | 7 |
| | C | | 5.5 | | | | | | | | 4 | | 4 | 3 | | |
| | Fe | | | 5.5 | | | | | | | | | | | | |
| | Ni | | | | 5.5 | | | | | | | | | | | |
| | SiC | | | | | 5.5 | | | | | | | | | | |
| BINDER | EPOXY RESIN | 35 | 35 | 35 | 35 | 35 | | | 31 | 13 | 14 | 31 | | 36 | 33 | 32 |
| | PHENOLIC RESIN | | | | | | | 26 | | | | | 35 | | | |
| | SILICONE RESIN | | | | | | 30 | | | | | | | | | |
| | INORGANIC BINDER | | | | | | | | | 13 | 14 | | | | | |
| REINFORCING FIBER | METAPHOSPHATE | | | | | | | | | | | | | | | 2 |
| | FIBERGLASS | | | | | | | | | | | | | | 4 | |

*ALL INGREDIENTS ARE IDENTIFIED AS WEIGHT % OF TOTAL MIXTURE

FIG. 2

METHOD OF MANUFACTURING A FRICTION ARTICLE

BACKGROUND OF THE INVENTION

This invention relates to a method of manufacturing a friction article wherein a fiber material having a continuous three dimensional matrix is filled with a slurry. The slurry is made up of various friction modifiers and fillers carried in a sometimes volatile solution of liquid binders. Volatiles are evaporated leaving the friction modifiers and binder in the matrix. A compressive force of about 10 $Kg/cm^2$ can be applied to the filled fiber material to establish a greater desired density during curing of the binder to establish a second matrix which holds the friction modifiers in the first matrix.

In the past it has been common practice to manufacture friction articles by mixing together friction modifiers, reinforcing fibers, and binders. The binders when cured form a matrix for holding the reinforcing fibers and friction modifiers in a fixed relationship. The reinforcing fibers are randomly orientated to provide structural unity for the friction article. When the reinforcing fiber was asbestos this type of processing resulted in an adequate friction article. Unfortunately, asbestos has been identified as a potential material which under some circumstances may be a health hazard. As a result, other reinforcing materials such as glass fiber, steel fiber, cellulose, kevlar, and mixtures thereof have been investigated as a replacement for asbestos. As could be expected, the processing which was developed over the years for asbestos could not be used without modification for the other reinforcing materials. For instance, both under and over blending of glass fiber results in a friction composition wherein the resulting wear and coefficient of friction are unacceptable.

In recent years much research and development has taken place in an effort to produce an open foam structure which is light weight and yet structurally uniform. U.S. Pat. Nos. 3,616,841 and 3,946,039 disclose methods of producing such a foam structure wherein the resulting matrix is substantially uniform and continuous in all three directions. These structures have a high strength to weight ratio and are used in construction of various apparatus such as aircraft structural members, heat exchanger cores, sound and shock absorbers, and filters.

SUMMARY OF THE INVENTION

An open foam structure having a continuous three dimensional matrix was obtained and cut into a desired shape of a brake pad. A slurry made up of a filler (Barytes), friction modifier (coke), and a reinforcing fiber (calcium sodium metaphosphate) carried in a liquid binder (epoxy resin) solution was drawn into the pores of the open foam structure until a desired density was obtained. The filled foam structure was conveyed to a dryer where the volatiles were removed by evaporation. The dried filled foam structure was conveyed to an oven where a force of about 10 $Kg/cm^2$ was applied while the binder was cured to produce a predetermined density in the resultant friction article. The binder when cured formed a second matrix for holding the filler, friction modifier and reinforcing fiber in the three dimensional matrix. The friction material after being ground to a final dimension was tested and exhibited a substantial uniform coefficient of friction up to 230° C.

One advantage that this process of manufacturing provides is that a sheet of three dimensional structural open foam material can be carried through a stamping machine to produce blanks that have a specific size. The blanks can be stored until needed or immediately transferred to a station where vacuum draws a slurry into and fills the pores in the foam material. A binder in the slurry when cured forms a corresponding matrix which holds the friction modifiers and filler in the slurry in a fixed position to produce a friction article.

It is an object of thus invention to provide a method of manufacturing a friction article from an open foam structural member which is filled by a slurry of friction modifiers and a binder. The binder is cured to establish a matrix which holds the friction modifiers in the foam structure. The three dimensional structure provides strength for the friction article in addition to carrying heat away from an operational surface thus allowing the friction article to operate for a longer time without degradation in the coefficient friction.

These advantages and objects should be apparent from reading this specification while viewing the accompanying drawings.

BRIEF DESCRIPTION OF THE DRAWINGS

FIG. 2 is a table listing the ingredients of various composition evaluated in carrying out the method disclosed in FIG. 1;

DETAILED DESCRIPTION OF THE INVENTION

Figure 1:
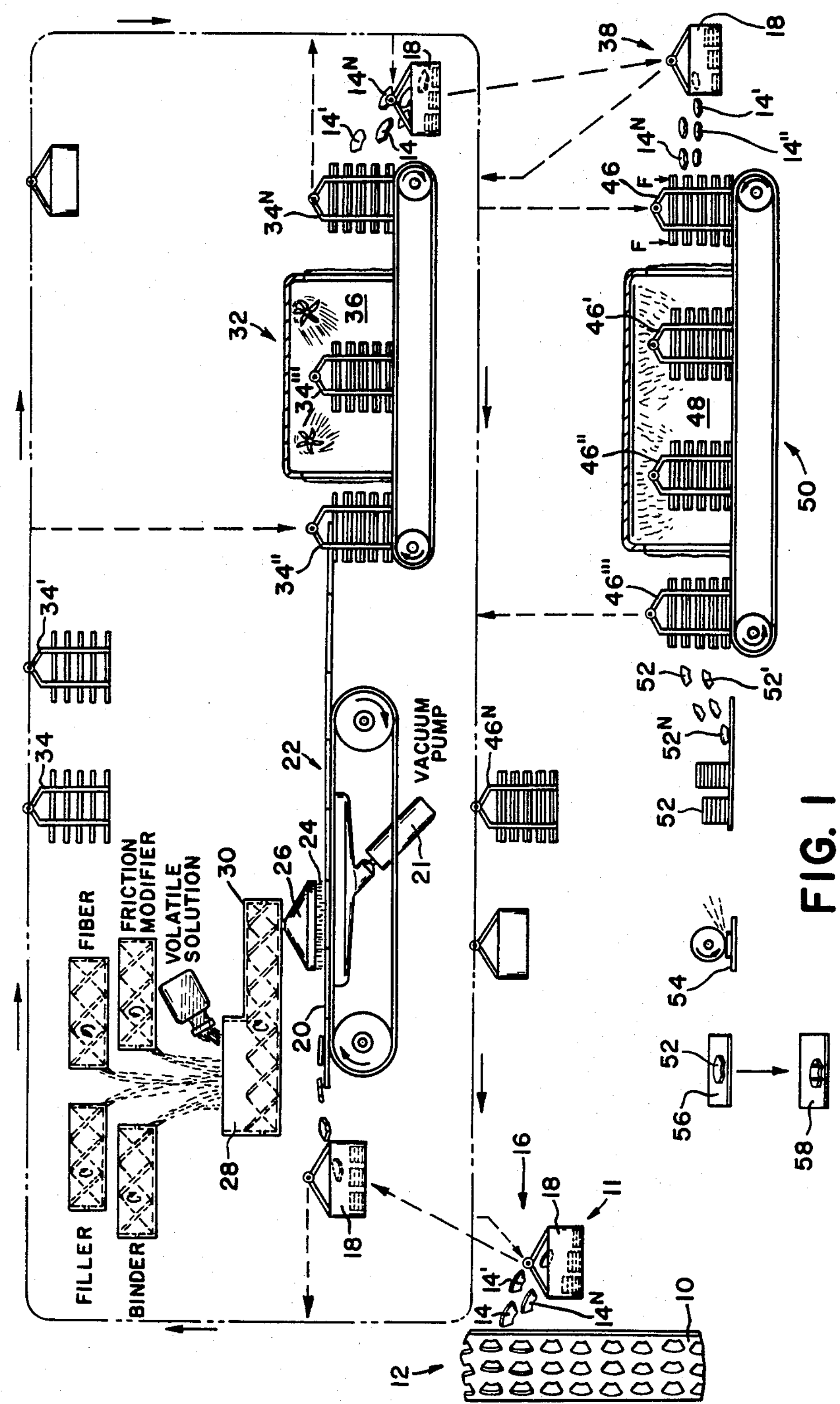
FIG. 1 is a schematic illustration of a proposed manufacturing facility for use in practicing the method of making a friction article according to the principals of this invention.

As illustrated in FIG. 1, a sheet of open foam material 10 of a type manufactured by a process such as disclosed in U.S. Pat. No. 3,946,039 is conveyed through a first station 12 where a press stamps out blanks 14, 14'. . . 14$^N$. The blanks 14, 14'. . . 14$^N$ which have been cut to an arcurate shape have a matrix which extends in all three dimensions with substantially the same pattern. The blanks 14 are conveyed to a second station 16 where a plurality of the blanks 14,14'. . . 14$^N$ are placed on a tray 18.

The blanks 14, 14'. . . 14$^N$ are removed from tray 18 and placed on a continuous moving conveyor 20 and transported to a station 22. At the same time a slurry 24 is uniformily spread over the blanks 14, 14'. . . 14$^N$ as they move past nozzle 26.

The slurry 24 is made up in a continuously operating mixer 28 into which a filler (whiting, barytes, talc, etc.), a friction modifier (coke, iron powder, cashew nut powder, zinc, brass, etc.), reinforcing fiber (glass fiber, calcium sodium metaphosphate, etc.), and liquid binders (epoxy resin, phenolic resin, inorganic resin, silicone resin, etc.) are uniformly mixed. In most instances, the liquid binders should make up about 30–40% by weight of the total mixture for ease in handling. An aguer 30 moves the slurry 24 from mixer 28 to nozzle 26 for distribution to the blanks 14, 14'. . . 14$^N$ at station 22. As blanks 14, 14'. . . 14$^N$ enter station 22, a vacuum from pump 21 draws the slurry through the blanks and fills the open pores that are located within the three dimensional matrix.

On exiting from station 22, the blanks 14, 14'. . . 14$^N$ are conveyed to dryer station 32. As blanks 14, 14'. . . 14$^N$ reach dryer station 32 they are placed on a loading rack 34. When a rack 34 is filled it is conveyed into the dryer chamber 36 where the volatiles in the slurry 24 are removed. Each rack 34, 34'. . . 34$^N$ is in chamber 36 which has a substantially constant temperature of about 100° C. for about an hour. Under some circumstances, it may be desirable, i.e. when a phenolic resin binder is used, to pressurize chamber 36 to reduce the formation of voids caused by gas bubbles as the volatiles evaporate. The racks 34 are conveyed from chamber 36 and the blanks 14, 14'. . . 14$^N$ removed therefrom before being transported to a station 38 in trays 18, 18'. . . 18$^N$. The filled and dried blanks 14,14'. . . 14$^N$ are removed from trays 18,18'. . . 18$^N$ and placed on rack 46. Trays 18,18'. . . 18$^N$ are subsequentially conveyed back to station 16 to be filled with blanks 14,14'. . . 14$^N$ for another pass through this first stage of the manufacture of a friction article.

On being removed from the trays 18,18'. . . 18$^N$ at station 38, the filled and dried blanks 14,14'. . . 14$^N$ are placed in a curing rack 46. When the curing rack 46 is filled, a force F may be applied to compress the blanks 14,14'. . . 14$^N$. Thereafter the curing rack 46 is conveyed into chamber 48 of oven 50. The temperature in chamber 48, which can vary from 200°–400° C. depending on the binder selected, is such that the binder is cured to define a second matrix, which holds the filler, reinforcing fiber, and friction modifier within the first (or three dimensional) matrix to define a friction article 52. The friction articles 52,52'. . . 52$^N$ are removed from rack 46 and conveyed to a grinding station 54 where the final desired size of friction article 52 is obtained. After grinding, the friction article 52 is inspected at station 56 and if acceptable transferred to station 58 where it is marked with an identifying stamp and packed for shipment to an end user.

MODE OF OPERATION OF THE INVENTION

In order to evaluate the method of manufacturing a friction pad as disclosed herein, sheets of open foam material made of aluminum, carbon, iron, nickel and silicon carbide were obtained and cut into a desired shape. Each of the arcurate shaped disc brake pad open foam structures had from 14–18 pores per linear centimeter and an average pore size of about 0.05 cm with approximately 93–95% voids in the three dimensional structure. A friction material composition based on the above general information for open foam base structure was formulated in accordance with the weight percentages set forth in FIG. 2.

A slurry made up of fillers (barytes and whiting), friction modifiers (coke and rubber), and an epoxy resin plus an anhydride curing agent, was mixed together until a uniform consistency was obtained.

The foam blanks identified as A, B, C, D, and E were placed in a tray which was supported only on the edges thereof and transported to a chamber. A quantity of slurry was placed on the top of each of the blanks A, B, C, D, and E and a vacuum applied to the bottom thereof. The vacuum acting through the pores in the foam structure pulled the slurry into and filled the pores or voids in the foam structure. The filled foam structures were removed from the vacuum chamber and transported to a curing oven where the epoxy resin binder (Epon 828 + Curative Z manufactured by Shell Oil Co.) was cured in about 4 hours in a temperature of about 175° C.

After the binder was cured, the resulting friction pads A, B, C, D, and E were ground to a predetermined size and placed on a Chase dynamometer.

After an initial break-in period each, sample A, B, C, D, and E was subjected to 40 brake applications at temperatures of 120° C., 175° C. and 230° C. and the resultant coefficient of friction measured to bring a Chase dynamometer to a stop.

Figure 3:
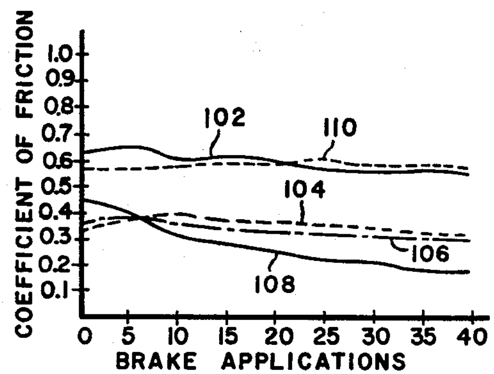
FIG. 3 is a graph illustrating the coefficient of friction for various compositions operating at 120° C. during repeated brake applications.
Figure 4:
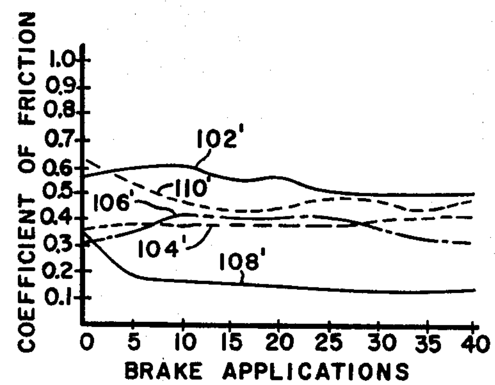
FIG. 4 is a graph illustrating the coefficient of friction for various compositions operating at 176° C. during repeated brake applications.
Figure 5:
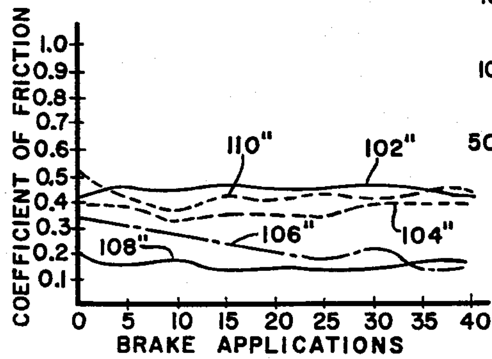
FIG. 5 is a graph illustrating the coefficient of friction for various compositions operating at 232° C. during repeated brake applications.

The coefficients of friction for aluminum (A), carbon (B), iron (C), nickel (D), and silicon carbide (E) are illustrated at 120° C. by curves 102, 104, 106, 108, and 110, respectively in FIG. 3, at 175° C. by curves 102', 104', 106', 108', and 110', respectively in FIG. 4, and at 230° C. by curves 102'', 104'', 106'', 108'', and 110'', respectively in FIG. 5.

As seen in FIGS. 3, 4, and 5, the aluminum (A) and silicon carbide (E) foam structures produce relative high coefficient of friction while nickel (D) exhibits the lowest coefficient of friction. The carbon foam structure (B) exhibited a substantially stable coefficient of friction over the entire test range. The iron foam structure (C) exhibited substantially stable coefficient of friction at 120° and 175° C. but at 230° C. the coefficient of friction showed a linear decline or fade.

Figure 6:
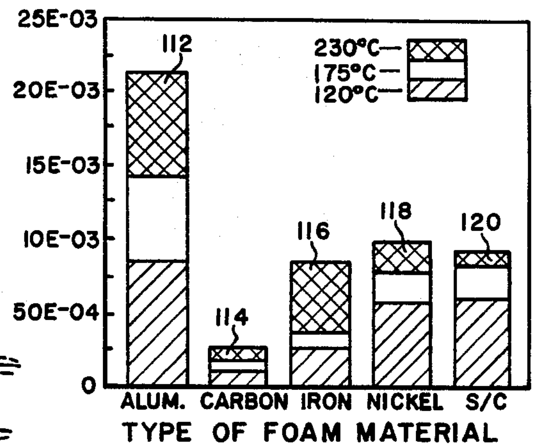
FIG. 6 is a graph showing the cumulative wear rate for various compositions when operated at various temperatures.

After a sequence of 40 stops, each friction pad A, B, C, D, and E was measured for wear that occurred when operated at 120° C., 175° C., and 230° C. The individual wear for each sequence and the cumulative wear for aluminum carbon, iron, nickel and silicone carbide is set forth in graphs 112, 114, 116, 118, and 120, respectively, in FIG. 6. The carbon foam structure (B) exhibited minimal wear for each temperature and the least total over all wear. The above test clearly illustrated that a carbon foam structure possessed the most stable coefficient of friction and least wear.

Previous experience indicated that the epoxy resin binder used in examples A, B, C, D, and E degraded when the operating temperature is above 260° C. Therefore, in order to evaluate a foam structure capable of operating in temperature ranges of about 400° C., which can occur in the operation of brakes on various vehicles, several binders which experience indicates could operate at such a temperature were substituted for the binder in compositions A–E. Since aluminum from structural material is currently the least expensive and most easy to obtain, this three dimensional structure foam material was used to evaluate the proposed high temperature binders.

The composition for foam structures impregnated with a slurry having a high temperature binder is illustrated in FIG. 2 as composition F, G, and H.

Figure 7:
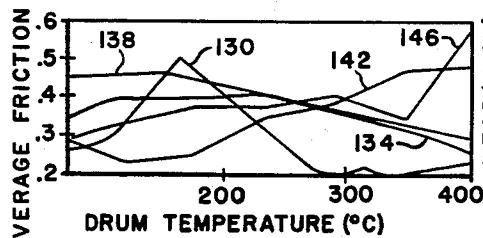
FIG. 7 is a graph showing the coefficient of friction for various compositions operating over a wide temperature range.
Figure 8:
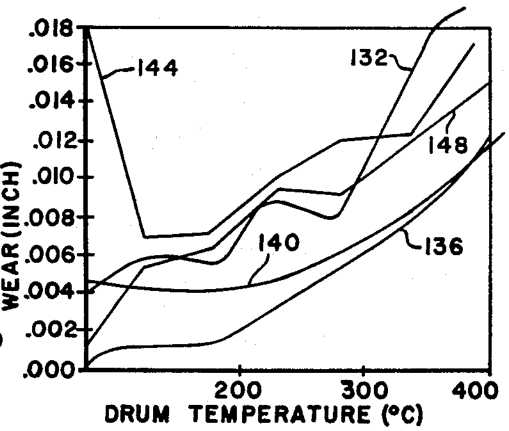
FIG. 8 is a graph showing the wear rate associated with the coefficient of friction in FIG. 7.

In composition F, the binder is liquid silicone resin obtained from General Electric and identified to the industry as SR-350. A slurry formed by mixing the fillers (barytes and whiting), friction modifiers (coke and rubber) and a binder of silicone resin was vacuum impregnated into the aluminum foam resin structure. The resulting friction article had an average coefficient of friction as illustrated by curve 130 in FIG. 7 and a coefficient of wear as illustrated by curve 132 in FIG. 8.

In composition G, the binder was a liquid phenolic resin of the type manufactured and sold to customers by the Bendix Corporation under the trade designation as V-1419. The aluminum foam structure was vacuum impregnated with a slurry made of the fillers (barytes and whiting), friction modifiers (coke and rubber), and phenolic resin. After the foam structure was filled with the slurry, the filled structure was transported to a drying chamber where the volatiles in the slurry were slowly removed to reduce the formation of bubbles or surface depressions. Thereafter the filled foam structure was transported to an oven where the phenolic resin was cured. When composition G was tested on the dynamometer a coefficient of friction illustrated by curve 134 in FIG. 7 was produced and a wear rate illustrated by curve 136 in FIG. 8 was measured.

In composition H, the binder is an epoxy resin manufactured by Shell Chemical Co. and sold to customers under a trade name of EPON 825. EPON 825 is considered a high temperature epoxy which is cured with an anhydride agent. An aluminum foam structure was vacuum impregnated with a slurry made of fillers (barytes and whiting), frition modifiers (coke and rubber), and epoxy resin (EPON 825) and anhydride curing agent. After the epoxy resin was cured, the resulting brake lining or friction material was subjected to the dynamometer testing and produced a coefficient of friction illustrated by curve 138 in FIG. 7 and a wear rate illustrated by curve 140 in FIG. 8 was produced.

Each of the compositions F, G, and H while operable in the 400° C. range exhibited a linear increase in wear above 290° C. This wear rate is attributed to the high binder content in the compositions. However such binder content is considered essential for good slurry impregnation of a foam structure.

In order to evaluate the extent that the high percent of epoxy resin had on the operating characteristics of the foam structure, a liquid inorganic binder, made up of a primary metal acid reacted with a primary metal oxide to produce a polyphosphate acid, was substituted for about one half of the degradable epoxy resin (EPON 825). The liquid inorganic binder resin cures to what is essentially a ceramic filler with high thermal stability, but, from previous experience with this type material, it is too brittle for total substitution for an epoxy resin.

A friction material was made according to the formula identified as composition I in FIG. 2. An aluminum foam structure was vacuum impregnated with a slurry of the fillers (barytes and whiting), friction modifiers (coke and rubber), and a binder made up of epoxy resin and the inorganic binder. After curing, this friction material was subjected to the 400° C. dynamometer testing procedure. Composition I produced an average coefficient of friction as shown by curve 142 in FIG. 7, and a wear rate shown by curve 144 in FIG. 8. Composition I showed an improved high temperature coefficient of friction as compared with composition H where the binder was entirely epoxy resin, however the wear rate above 340° C. was higher than desirable.

Since carbon foam structure had the lowest wear rate, a friction material was made according to the formula identified as composition J in FIG. 2. A carbon foam structure was vacuum impregnated with a slurry of fillers (barytes and whiting), friction modifiers (coke and rubber), and a binder made up of the epoxy resin and inorganic binder of Composition H. After curing, this friction material was subjected to the 400° C. dynamometer testing procedure. Composition J produced an average coefficient of friction as illustrated by curve 146 in FIG. 7 and a wear rate illustrated by curve 148 in FIG. 8. Composition J did show an improvement over composition I through a reduction in wear. It is anticipated that the wear of composition J could be further reduced by the addition of more coke or carbon and an increase in rubber to provide a greater degree of flexibility.

Since all of the compositions A–J were only tested using Chase dynamometer samples it was decided that a full scale test should be performed.

Figure 9:
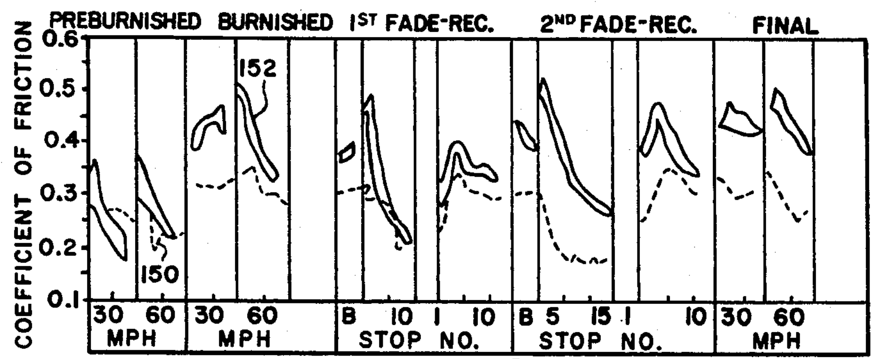
FIG. 9 is a graph of data obtained from an inertial dynamometer for a first friction article manufactured according to this invention.

A full sized brake pad based on composition K in FIG. 2 was made by vacuum impregnating a slurry of fillers (barytes and whiting), friction modifiers (rubber and coke), and an epoxy resin binder (EPON 825) into an aluminum foam structure. After curing the epoxy resin into a matrix for holding the barytes, whiting, rubber, and coke in the three dimensional aluminum matrix, this full size brake pad was tested on an inertia dynamometer in accordance with a modified SAE Performance (Schedule 111). The coefficient of friction for composition K is illustrated by data band 150 and compared with base line 152 in FIG. 9. Base line 152 is considered as an acceptable limit for the coefficient of friction for a brake lining.

Figure 10:
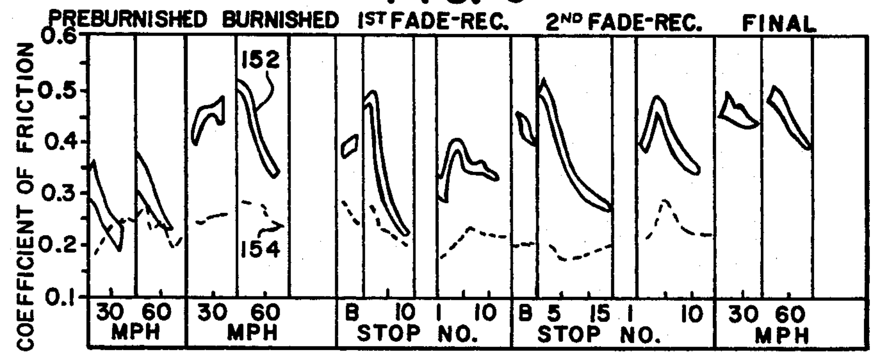
FIG. 10 is a graph of data obtained from an inertial dynamometer for a second friction article manufactured according to this invention.
Figure 11:
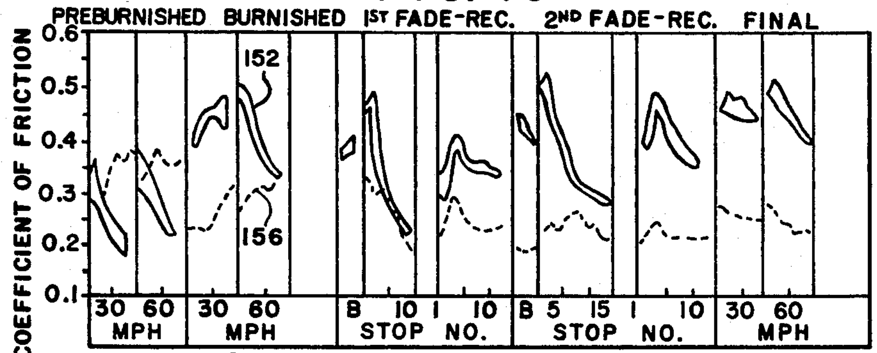
FIG. 11 is a graph of data obtained from an inertial dynamometer for a third friction article manufactured according to this invention.

Since the carbon foam material exhibited the least wear when tested on the sample dynamometer, full size brake pads were manufactured through the vacuum impregnation of a phenolic resin slurry, composition L in FIG. 2, and epoxy resin slurry, composition M in FIG. 2, into a carbon foam structural material. The coefficient of friction for composition L as established during test schedule is illustrated by data band 154 in FIG. 10 and for composition M by data band 156 in FIG. 11.

In evaluating the performance of compositions K, L, and M it was observed that composition K performed adequately until the operating temperature reached 315°–340° C. As the temperature increased, friction decreased and pad wear accelerated while at the same time the structural strength also decreased.

To increase the density of the friction pad and reduce surface glaze during high temperature operation iron powder was added to the basic composition to produce composition L, shown in FIG. 2. It was observed that the brake pad made with composition L had a lot of porosity due to outgassing of the volatile during the curing of the phenolic resins. The brake pads while surviving the test schedule of the inertia dynamometer possessed several structural cracks. It is assumed that the cracking and associated wear were due to excessive porosity caused by the high phenolic resin content, i.e. the phenolic resin in current industry-accepted brake linings is from 15-20% by weight.

Composition M, which also survived Schedule 111, also exhibited cracking and structural degradation when operated above 315° C.

It was therefore decided to evaluate a foam structure wherein a fine fiber was incorporated with the slurry and impregnated into the structural matrix of the binder to improve the structural strength of the resulting friction pad.

Figure 12:
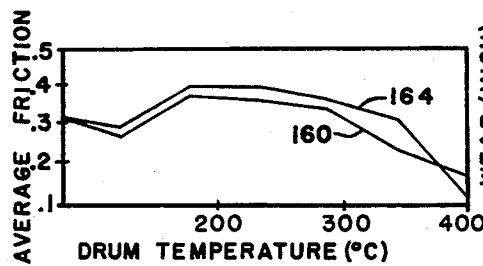
FIG. 12 is a graph illustrating the coefficient of friction for a fiber reinforced composition operating over a wide temperature range.
Figure 13:
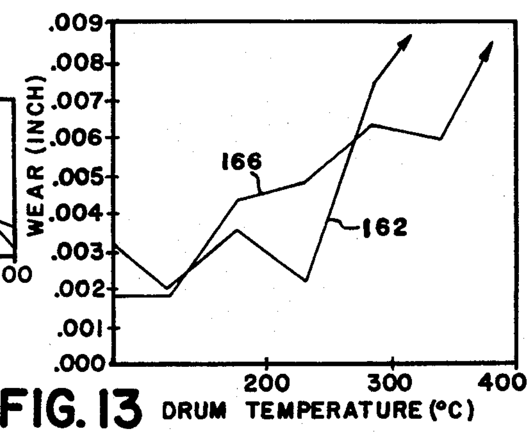
FIG. 13 is a graph illustrating the wear rate associated with the coefficient of friction for the compositions of FIG. 12.

An aluminum foam structure was vacuum impregnated with a slurry of fillers (barytes and whiting), friction modifiers (coke and rubber), fiber glass and an epoxy resin binder (EPON 825) to produce composition N shown in FIG. 2. Composition N when tested on the Chase dynamometer had a coefficient of friction as illustrated by curve 160 in FIG. 12 and a wear rate illustrated by curve 162 in FIG. 13.

A similar aluminum foam structure was vacuum impregnated with a slurry of fillers (barytes and whiting), friction modifiers (coke and rubber), metaphosphate fiber and an epoxy resin binder (EPON 825) to produce composition O shown in FIG. 2. Composition O when tested on the Chase dynamometer had a coefficient of friction as illustrated by curve 164 in FIG. 12 and a wear rate illustrated by curve 166 in FIG. 13.

Based on Chase dyno sample appearance, compositions N and O had improvements in their structural strength over Composition K because of the added fiber reinforcement since structural cracks were not evidenced.

It was determined that the actual density produced through the vacuum impregnation of a slurry into a foam structure followed by oven curing was only about 90% of the theoretical density. In order to improve the density, a nonvolatile liquid binder would be necessary for processing. In addition a compressive force of between 8-10 $Kg/cm^2$ applied to the dried and slurry filled segments may be beneficial if the foam structure was either aluminum or iron.

We claim:

1. A method of manufacturing a friction article for use in a brake comprising the steps of:

stamping a blank having a predetermined shape from a web of open foamed material selected from a group consisting of carbon, iron, silicon carbide, nickel, and aluminum, said web having voids therein produced by a substantially continuous three dimensional matrix, said three dimensional matrix providing uniform structural rigidity for said blank and a conductive flow path for thermal energy;

placing said blank on a conveyor;

preparing a slurry made up of fillers, modifiers and a liquid binder in a volatile solution;

moving said blank to a location where said slurry fills said voids to create a preformed friction article;

transporting said preformed friction article to a dryer where about fifty percent of said volatile solution is removed without the formation of surface depressions caused by the release of bubbles of gas;

conveying said dried preformed friction article to an oven to cure said binder and form a second matrix which holds said fillers, modifiers, and fibers in said three dimensional matrix; and applying a force to said preformed friction article during curing to produce a desired density in said friction article.

2. The method as recited in claim 1 wherein said open structure has a porosity of about 95-98% and from 14-18 pores per linear centimeter with an average pore size of 0.05 cm.

3. The method as recited in claim 1 wherein said volatile solution makes up from 30-40% by weight of the total slurry.

4. The method as recited in claim 3 wherein said slurry includes a reinforcing fiber for said second matrix selected from a group consisting of glass or metaphosphate, said fiber making up to 15% by weight of the total slurry.

5. The method as recited in claim 3 wherein said friction modifiers are selected from a group consisting of coke, iron powder, cashew nut powder, zinc and brass.

6. The method as recited in claim 5 wherein said filler is selected from a group consisting of barytes, talc, and whiting.

7. The method as recited in claim 6 wherein said liquid binder is selected from a group consisting of epoxy resins, phenolic resins, inorganic resins, silicone resins and mixtures thereof.

8. The method as recited in claim 7 wherein said dryer has a constant temperature of about 100° C. and any volatiles in said binders are removed in such a manner to prevent the formation of undesirable voids in the performed friction article.

9. The method as recited in claim 7 wherein said oven is maintained at a temperature of about 200° C. during the cure of said binder in said friction article.

10. The method as recited in claim 9 further including the step of:

applying a vacuum to said fiber material to aid in filling the open structure with slurry.

11. The product produced by the method recited in claim 10.

* * * * *